United States Patent [19]

Ohsawa et al.

[11] Patent Number: 4,596,844
[45] Date of Patent: Jun. 24, 1986

[54] SELF-HARDENABLE RESIN COMPOSITION

[75] Inventors: Akira Ohsawa, Yokohama; Syuichi Manabe, Zushi, both of Japan

[73] Assignee: Nippon Oil and Fats Company, Japan

[21] Appl. No.: 740,837

[22] PCT Filed: Sep. 28, 1984

[86] PCT No.: PCT/JP84/00463
§ 371 Date: May 20, 1985
§ 102(e) Date: May 20, 1985

[87] PCT Pub. No.: WO85/01506
PCT Pub. Date: Apr. 11, 1985

[51] Int. Cl.⁴ .................. C08G 59/60; C08L 63/10
[52] U.S. Cl. .................................. 523/417; 523/414; 523/420; 525/504; 528/111; 528/121; 528/123; 204/181.7
[58] Field of Search ............... 528/111, 121, 123; 523/414, 417, 420; 525/504

[56] References Cited

U.S. PATENT DOCUMENTS

| | | | |
|---|---|---|---|
| 3,888,827 | 6/1975 | Matueda et al. | 528/121 X |
| 3,914,335 | 10/1975 | Tugukuni et al. | 528/75 X |
| 3,925,349 | 12/1975 | Gaske | 528/121 X |
| 4,151,148 | 4/1979 | Chasin et al. | 525/438 X |
| 4,198,331 | 4/1980 | Buchwalter et al. | 528/121 X |
| 4,476,271 | 10/1984 | Kano et al. | 523/415 X |

Primary Examiner—Earl Nielsen
Attorney, Agent, or Firm—Parkhurst & Oliff

[57] ABSTRACT

The present invention relates to a water-dispersible self-hardenable resin composition, and particularly to a self-hardenable resin composition, which has a low-temperature hardenability and is adapted for the cationic electrodeposition painting wherein a material to be painted is used as a cathode.

The present invention provides a self-hardenable resin composition consisting essentially of a Michael type addition reaction product consisting of 65–95% by weight (in solid base) of a polyamine resin having amino groups and/or imino groups and 35–5% by weight of an ethylenically unsaturated compound having an amine-imido group.

7 Claims, No Drawings

SELF-HARDENABLE RESIN COMPOSITION

TECHNICAL FIELD

The present invention relates to a water-dispersible self-hardenable resin composition, and more particularly to a self-hardenable resin composition, which as a low-temperature hardenability, and is adapted for a cationic electrodeposition painting wherein a material to be painted is used as a cathode.

BACKGROUND ART

The cationic electrodeposition painting is superior to the commonly used anionic electrodeposition painting in rust resistance of painted material, and has recently been increasingly used in the field of painting for automobile and other fields.

There have been proposed various resin compositions to be used for such cationic electrodeposition painting. However, practically used resin compositions are water-dispersible resin compositions disclosed, for example, in Japanese Patent Laid-open Specification Nos. 51,924/73 and 126,225/76, which are produced by a method wherein an epoxy resin consisting of a bisphenol A/epichlorohydrin condensate is reacted with a primary amine or secondary amine, the aminated epoxy resin is reacted with a partially blocked polyisocyanate, and the reaction product is made into water dispersible.

However, such blocked polyisocyanate type hardenable cationic electrodeposition paint has serious drawbacks that the paint is higher in baking temperature and is larger in the amount of generating tar than the conventional anionic electrodeposition paint.

DISCLOSURE OF THE INVENTION

The inventors have made various investigations in order to solve the above described problems, and found out that, when amine-imido group is pendantly introduced into a polyamine resin having amino groups and/or imino groups, the amine-imido group is thermally decomposed and rearranged at a low temperature (not lower than 120° C., preferably 140°–160° C.) to split a tertiary amine and to form an isocyanate group according to the following formula

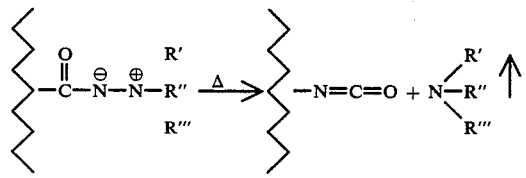

and the resulting isocyanate group is reacted with hydroxyl group and/or amino or imino group in the resin to form a three-dimensional structure, whereby an infusible and insoluble hardened paint film is obtained, and the amine-imido group is neutralized with an acid to form a quarternary ammonium base, whereby a stable aqueous dispersion of cationic resin is formed and this aqueous cationic resin dispersion can be utilized in the cationic electrodeposition painting. As the result, the present invention has been accomplished.

That is, the feature of the present invention lies in a self-hardenable resin composition consisting mainly of a Michael type addition reaction product consisting of 65–95% by weight (in solid basis) of a polyamine resin having amino groups and/or imino groups and 35–5% by weight of an ethylenically unsaturated compound having an amine-imido group.

The polyamine resin having amino groups and/or imino groups to be used in the present invention (hereinafter, this resin is merely called as polyamine resin) includes, for example, a reaction product of a polyepoxide with a ketimine-blocked amino group-containing polyamine, a reaction product of a polyepoxide with a primary amine, and the like.

The polyepoxide is a compound having at least one 1,2-epoxy functional group, and includes, for example, polyglycidyl ether of polyphenol (which is obtained by etherifying polyphenol with epichlorohydrin or dichlorohydrin in the presence of an alkali) and the like.

As the polyphenol, there can be used, for example, bisphenol A [i.e., 2,2-bis(4-hydroxyphenyl)-propane], 1,1-bis(4-hydroxyphenyl)ethane, 2-methyl-1,1-bis(4-hydroxyphenyl)propane, 2,2-bis(4-hydroxy-3-t-butylphenyl)propane, bis(2-hydroxynaphthyl)methane, 1,5-dihydroxynaphthalene and the like.

As the polyphenol, there can be further used oxyalkylated products of polyphenol (for example, addition products of ethylene oxide or propylene oxide to polyphenol), novolac type phenolic resin, and polyphenolic resins like these oxyalkylated products of polyphenol, and novolac type phenolic resin.

As other polyepoxide, there can be used, for example, epoxidized polyalkadiene resin, glycidyl(meth)acrylic copolymer resin, polyglycidyl ether of hydroxyl group-containing resin, polyglycidyl ester of carboxyl group-containing resin and the like.

As the polyepoxide, there can be further used ones having an increased molecular weight through chain extending. In this case, as the chain extender, use is made of compounds containing active hydrogen atoms having a reactivity with epoxy functional group, for example, compounds containing hydroxyl group, amino group, imino group, thiol group, carboxyl group or the like (for example, glycol, diamine, polyether, polyol, dimer acid, hydantoin, bisphenol A, polyamide, amino acid and the like).

The polyepoxide is reacted with an amine (primary amine or ketimine-blocked amino group-containing polyamine) to form a polyamine resin.

As the primary amine, there can be preferably used mono-amines, for example, propylamine, butylamine, amylamine, 2-ethylhexylamine, monoethanolamine and the like.

The primary amine is reacted with an epoxy group to form a secondary amine useful for a Michael type addition reaction carried out later.

As the ketimine-blocked amino group-containing polyamine, use is made of ones, which are formed by converting the amino group in a polyamine (for example, diethylenetriamine, dipropylenetriamine, dibutylenetriamine, triethylenetetramine or the like) into a ketimine group through a reaction of the amino group with a ketone (for example, acetone, methyl ethyl ketone, methyl isobutyl ketone or the like).

The ketimine group of the ketimine-blocked amino group-containing polyamine, after reacted with epoxy group, is decomposed in the presence of water to form an amino group which is useful in a Michael type addition reaction carried out later.

The polyamine resin is produced according to the ordinary method, and the fundamental production steps are as follows.

Into a reaction vessel is charged a part or whole of polyepoxide, and stirred under an inert gas atmosphere to form a homogeneous liquid. In this step, if necessary, heating, addition of a proper organic solvent, a preliminary reaction of the polyepoxide with other component (for example, bisphenol A or the like), and the like can be carried out. Then, a polyamine is added to the above obtained homogeneous liquid of polyepoxide while stirring the liquid at a proper temperature under an inert gas atmosphere. The addition of the polyamine to the polyepoxide is carried out such that the total amount of the polyamine is added to the polyepoxide at one time, or the polyamine is added to the polyepoxide in several installments or drop by drop. Further, the kind and amount of polyamine to be added to polyepoxide can be varied depending the addition stage. During this stage, heating, cooling, reflux of volatile matter, addition of a part of polyepoxide, addition of organic solvent and the like can be carried out. After completion of the addition of polyamine, the reaction is occasionally further continued under a proper temperature.time condition, and then the reaction mixture is occasionally added with other components and reacted therewith, and the reaction product is subjected to dilution with an organic solvent, distillation and filtration to obtain a polyamine resin solution.

The ethylenically unsaturated compound having an amine-imido group to be used in the present invention is represented by the following general formula

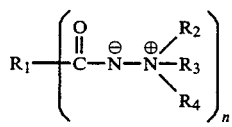

wherein n is an integer of 1 or 2, $R_1$ represents a residue or mono- or di-basic ethylenically unsaturated carboxylic acid, and $R_2$, $R_3$ and $R_4$ represent alkyl or hydroxyalkyl groups having 1-6 carbon atoms. These ethylenically unsaturated compounds are, for example, 1,1,1-trimethylamineacrylimido, 1,1-dimethyl-1-ethylamineacrylimido, 1,1-dimethyl-1-(2-hydroxypropyl)amineacrylimido, 1-methyl-1-butyl-1-(2-hydroxypropyl)amineacrylimido, 1-methyl-1-(2-hydroxyethyl)-1-(2-hydroxyhexyl)amineacrylimido, 1,1-dimethyl-1-(2-hydroxybutyl)-amineacrylimide, 1,1-dimethyl-1-(2-hydroxypropyl)aminecinnamylimido, bis-1,1,1-trimethylaminemaleimido, bis-1,1,1-trimethylaminefumarimido and the like.

The Michael type addition reaction of a polyamine resin to an ethylenically unsaturated compound having an amine-imido groups is carried out as follows.

A polyamine resin solution is charged into a reaction vessel, and then an ethylenically unsaturated compound having an amine-imido group is added to the polyamine resin solution while stirring the resulting mixture at a proper temperature, preferably at a temperature of not lower than 70° C. but not higher than 120° C. under an integer gas atmosphere. The addition of the ethylenically unsaturated compound having an amineimido group to the polyamine resin solution can be carried out such that the total amount of the ethylenically unsaturated compound is added to the polyamine resin solution at one time, or the ethylenically unsaturated compound is added to the polyamine resin solution in several installments or drop by drop. During this stage, heating, cooling, reflux of volatile matter, addition of organic solvent, and the like can be carried out. After completion of the addition of the ethylenically unsaturated compound having an amineimido group to the polyamine resin solution, the reaction is occasionally further continued under a proper temperature.time condition, and further the reaction mixture is occasionally subjected to dilution with an organic solvent, and filtration to obtain a resinous solution, which is a Michael type addition reaction product.

The mixing ratio of the polyamine resin and the ethylenically unsaturated compound having an amineimido group is preferably 65-95% by weight (in solid basis) of the polyamine resin and 35-5% by weight of the ethylenically unsaturated compound having an amineimido group. When the amount of the ethylenically unsaturated compound having an amine-imido group is less than 5% by weight, the resulting Michael type addition product has not a satisfactorily low-temperature hardenability, and the resulting paint film is poor in its physical properties. While, when the amount exceeds 35% by weight, the resulting aqueous dispersion is poor in the electrodepositing property, and the resulting paint film is poor in the physical properties.

The Michael type addition reaction product is converted into a quaternary ammonium base by neutralizing the amine-imido group contained in the addition reaction product with an acid, whereby an aqueous dispersion of the Michael type addition reaction product can be formed.

As the acid, organic acids and inorganic acids can be used. These acids are, for example, formic acid, acetic acid, lactic acid, phosphoric acid and the like.

The amount of quaternary ammonium base and the structure and molecular weight of various components to be contained in the Michael type addition rection product must be properly adjusted to each other by taking into consideration the dispersion stability, electrodepositing property, crosslinking hardenability, performance of paint film, and the like of the mixture of the addition reaction product with water.

When an anode and a cathode (electroconductive material to be painted) are immersed in a bath formed of the aqueous dispersion of the Michael type addition reaction product (that is, cationic electrodeposition paint), and a voltage is applied between the anode and cathode, an electrodepositable resin is deposited on the cathode surface in the form of a paint film.

The above described cationic electrodeposition painting technic is commonly known in the art, however it is necessary that the deposited paint film is not reactive with water so as not to be washed away in the water washing carried out after the object material having the electrodeposited paint film adhered thereto is taken out from the cationic electrodeposition painting bath.

The self-hardenable resin composition of the present invention consists essentially of a Michael type addition reaction product and an acid as a neutralizing agent, and contains other ingredients commonly used in the ordinary cationic electrodeposition paint, that is, plasticizer, surfactant, pigments (such as, color pigment, extender pigment, rust resisting pigment and the like, for example, titanium dioxide, carbon black, talc, kaolin, silica, lead silicate, basic lead chromate, zinc phosphate, and the like), organic solvents (such as hydrophilic organic solvents and semi-hydrophilic organic solvents, for example, isopropyl alcohol, butyl alcohol, ethyl cellosolve, butyl cellosolve, diacetone alcohol and the like), water and the like. These ingredients are homogeneously mixed and dispersed by means of a commonly used mixing and dispersing machine for the production of paint, such as dissolver, homomixer, sand grindmill, attriter, roll mill and the like, to obtain a cationic electrodeposition paint bath of an aqueous dispersion having a solid resin content of about 10-25% by weight.

A material to be painted is used as a cathode and is subjected to an electrodeposition painting in the above obtained cationic electrodeposition paint bath in the same manner as that in an ordinary cationic electrodeposition painting. The electrodeposited paint film formed on the cathode of an object material is washed with water and then subjected to a baking treatment at 130°-160° C. for 20-40 minutes to obtain a hardened paint film. This baking condition is lower by about 20° C. in baking temperature than the baking condition at 150°-180° C. for 20-40 minutes in the use of the conventional blocked polyisocyanate type hardenable cationic electrodeposition paint.

The above obtained hardened paint film is excellent in pencil hardness, adhesion, shock resistance, flexibility, corrosion resistance, water resistance, acetone rubbing resistance, acid resistance and the like.

Furthermore, amine which is formed by the thermal decomposition of the amine-imido group during the baking of painted film are rapidly volatilized, and therefore the amount of tar formed during the baking is smaller than that of tar formed during the baking of conventional blocked polyisocyanate type hardenable cationic electrodeposition paint.

BEST MODE FOR CARRYING OUT THE INVENTION

The present invention will be explained in more detail with reference to the following examples and comparative examples. In the examples, "parts" and "%" mean parts by weight and % by weight, respectively.

EXAMPLE 1

Into a reaction vessel were charged under a nitrogen gas atmosphere 532 parts of a polyepoxide (trademark: Epikote #1000, sold by Yuka Shell Epoxy K.K., an epoxy resin obtained by reacting bisphenol A with epichlorohydrin and having an epoxy equivalent of 450-500) and 28 parts of xylene, and the resulting mixture was gradually heated up to 140°-150° C. to remove water contained in the resin. Then, the mass was cooled to 120° C., added with 66 parts of xylene and 34 parts of 5,5-dimethylhydantoin, further kept at 120° C. for 2 hours, then cooled to 80° C., and added with 132 parts of a diketimine (produced from 1 mole of diethylenetriamine and 2 moles of methyl isobutyl ketone). The mass was kept at 80°-100° C. for 2 hours, and then added with 88 parts of deionized water and 62 parts of butyl cellosolve, and the resulting mixture was further added with 370 parts of an ethyl cellosolve solution containing 25% of 1,1-dimethyl-1-(2-hydroxypropyl)amineacrylimide, and the resulting mixture was kept at 90°-100° C. for 4 hours to obtain a self-hardenable resin composition solution.

To 100 parts of the resulting self-hardenable resin composition solution were added 2.5 parts of acetic acid and 240 parts of deionized water to obtain an aqueous dispersion having a solid content of 15%.

The resulting aqueous dispersion was charged in an electrodeposition tank made of vinyl chloride, and was adjusted in its temperature to 30° C. A material to be painted, which was a steel sheet previously treated with zinc phosphate, was connected to a cathode. As an anode, a stainless steel sheet was used, and a DC current of 180 volts was applied between the anode and cathode for 2 minutes under stirring to effect a cationic electrodeposition painting. After washed with water, the electrodeposited paint film was baked at 150° C. for 25 minutes to obtain a hardened paint film having a thickness of 19 microns in dry state.

The test results of the resulting hardened paint film are shown in Table 1.

Further, the above obtained electrodeposited paint film was tested with respect to the amount of generating tar and the test result is also shown in Table 1.

EXAMPLE 2

Into a reaction vessel were charged under a nitrogen gas atmosphere 507 parts of the same polyepoxide as used in Example 1 and 24 parts of xylene, and the resulting mixture was gradually heated up to 140°-150° C. to remove water contained in the resin. Then, the mass was added with 145 parts of dimer acid (trademark: Versadyme #216, sold by Dai-ichi General K.K.) and 1 part of dimethylethanolamine, and then kept at 120° C. for 2 hours. After the acid value of the mass was decreased to 1 or less, the mass was cooled to 80° C., added with 94 parts of the same diketimine as used in Example 1, further kept at 80° C. for 1 hour, added with 9 parts of monobutylamine, further kept at 80° C. for 1 hour, and then added with 63 parts of deionized water and 114 parts of butyl cellosolve. The resulting mass was added with 230 parts of an ethyl cellosolve solution containing 30% of 1,1,1-trimethylamineacrylimide, and the resulting mixture was kept at 70° C. for 3 hours to obtain a self-hardenable resin composition solution.

To 100 parts of the resulting self-hardenable resin composition solution were added 5.3 parts of lactic acid and 333 parts of deionized water to obtain an aqueous dispersion having a solid content of 15%.

The resulting aqueous dispersion was used, and a cationic electrodeposition painting was carried out in the same manner as described in Example 1, except that the voltage was 120 volts. After washed with water, the electrodeposited paint film was baked at 140° C. for 25 minutes to obtain a hardened paint film having a thickness of 20 microns in dry state.

The test results of the resulting hardened paint film are shwon in Table 1.

Further, the electrodeposited paint film was tested with respect to the amount of generating tar, and the test result is also shown in Table 1.

EXAMPLE 3

Into a reaction vessel were charged under a nitrogen gas atmosphere 507 parts of the same polyepoxide as used in Example 1 and 24 parts of xylene, and the resulting mixture was gradually heated up to 140°-150° C. to remove water contained in the resin. Then, the mass was added with 54 parts of xylene, 130 parts of polycaprolactone diol (trademark: PCP-0200, sold by Union Carbide Corp.) and 0.4 part of benzyldimethylamine, heated at 140° C. for 3 hours, added with 105 parts of methyl isobutyl ketone, cooled to 80° C., added with 150 parts of the same diketimine as used in Example 1, kept at 80° C. for 2 hours, and then added with 101 parts of deionized water and 115 parts of butyl cellosolve. The resulting mass was kept at 70° C., added with 276 parts of an ethyl cellosolve solution containing 30% of 1,1-dimethyl-1-(2-hydroxybutyl)amineacrylimide, and further kept at 70° C. for 2 hours to obtain a self-hardenable resin composition solution.

To 100 parts of the resulting self-hardenable resin composition solution were added 2.4 parts of acetic acid and 258 parts of deionized water to obtain an aqueous dispersion having a solid content of 15%.

The resulting aqueous dispersion was used, and a cationic electrodeposition painting was carried out in the same manner as described in Example 1, except that the voltage was 140 V. After washed with water, the electrodeposited paint film was baked at 150° C. for 25 minutes to obtain a hardened paint film having a thickness of 20 microns in dry state.

The test results of the resulting hardened paint film are shown in Table 1.

Futher, the electrodeposited paint film was tested with respect to the amount of generating tar, and the test result is also shown in Table 1.

EXAMPLE 4

Into a reaction vessel were charged under a nitrogen gas atmosphere 507 parts of the same polyepoxide as used in Example 1 and 24 parts of xylene, and the resulting mixture was gradually heated up to 140°-150° C. to remove water contained in the resin. Then, the mass was added with 135 parts of methyl isobutyl ketone and 34 parts of 5,5-dimethylhydantoin, heated at 120° C. for 2 hours, then added with 117 parts of butyl cellosolve, 41 parts of the same diketimine as used in Example 1 and 71 parts of ketimine (obtained by reacting 1 mole of monomethylaminopropylamine with 1 mole of methyl isobutyl ketone), and then kept at 80°-100° C. for 2 hours. The resulting mass was kept at 80° C., added with 60 parts of deionized water and 236 parts of an ethyl cellosolve solution containing 25% of bis-1,1,1-trimethylaminefumarimide, and further kept at 70°-80° C. for 2 hours to obtain a self-hardenable resin composition solution.

To 100 parts of the resulting self-hardenable resin composition solution were added 1.6 parts of acetic acid and 257 parts of deionized water to obtain an aqueous dispersion having a solid content of 15%.

The resulting aqueous dispersion was used, and a cationic electrodeposition painting was carried out in the same manner as described in Example 1, except that the voltage was 140 V. After washed with water, the electrodeposited paint film was baked at 140° C. for 25 minutes to obtain a hardened paint film having a thickness of 20 microns in dry state.

The test results of the resulting hardened paint film are shown in Table 1.

Further, the electrodeposited paint film was tested with respect to the amount of generating tar, and the test result is also shown in Table 1.

COMPARATIVE EXAMPLE 1

Into a reaction vessel were charged under a nitrogen gas atmosphere 652 parts of 2,4-tolylene diisocyanate and 50 parts of methyl isobutyl ketone, and the resulting mixture was added with 536 parts of 2-ethylhexanol drop by drop in about 5 hours while keeping the reaction system at 40° C. or lower under stirring, to obtain a 2-ethylhexanol semi-blocked compound of 2,4-tolylene diisocyanate.

Into another reaction vessel were charged 507 parts of the same polyepoxide as used in Example 1 and 24 parts of xylene, and the resulting mixture was gradually heated up to 140°-150° C. to remove water contained in the resin. Then, the mass was added with 127 parts of methyl isobutyl ketone, and further added with 174 parts of the above obtained 2-ethylhexanol semi-blocked compound drop by drop in 1 hour while keeping the resulting mixture at 100° C. After completion of the addition, the resulting mass was kept at 100° C. for 30 minutes, and then added with 130 parts of polycaprolactone diol (trademark: PCP-0200, sold by Union Carbide Corp.) and 0.4 part of benzyldimethylamine, heated at 120° C. for 5 hours, and then added with 183 parts of methyl isobutyl ketone.

The resulting mass was cooled to 80° C., added with 35 parts of the same diketimide as used in Example 1 and 31 parts of diethylamine, kept at 80° C. for 2 hours, and then added with 157 parts of ethyl cellosolve to obtain a polyamine resin solution.

To 100 parts of the resulting polyamine resin solutin were added 0.4 part of dibutyltin dilaurate, 2.5 parts of acetic acid and 230 parts of deionized water to obtain an aqueous dispersion having a solid content of 15%.

The resulting aqueous dispersion was used, and a cationic electrodeposition painting was carried out in the same manner as described in Example 1, except that the voltage was 160 V. After washed with water, the electrodeposited paint film was baked at 150° C. for 25 minutes to obtain a hardened paint film having a thickness of 20 microns in dry state.

The test results of the resulting hardened paint film are shown in Table 1.

Further, the electrodeposited paint film was tested with respect to the amount of generating tar, and the test result is also shown in Table 1.

TABLE 1

| Test item | Test method | Example 1 | Example 2 | Example 3 | Example 4 | Comparative example 1 |
|---|---|---|---|---|---|---|
| Appearance of paint film | visual judgement | good | good | good | good | good |
| Pencil hardness | Mitsubishi Uni | H | H | 2H | H | B |
| Impact resistance | du Point tester, ½ inch, 500 g | 50 cm, passed | 50 cm, passed | 50 cm, passed | 50 cm, passed | 50 cm, passed |
| Adhesion | cross cut adhesion 1 mm² | 100/100 | 100/100 | 100/100 | 100/100 | 100/100 |
| Flexibility | flexural test, 10 mmφ, 180° | no change | no change | no change | no change | cracks |
| Acetone rubbing resistance | reciprocating rubbing (upper limit: 100 times) | 100 times | 100 times | 100 times | 100 times | 76 times |
| Amount of | note | 8 | 5 | 3 | 8 | 24 |

TABLE 1-continued

| Test item | Test method | Example 1 | Example 2 | Example 3 | Example 4 | Comparative example 1 |
|---|---|---|---|---|---|---|
| generating tar (%) | | | | | | |

Note:
Test method for the amount (%) of generating tar: A test piece (which had been prepared by washing an electrodeposited paint film with water, and removing the water from the paint film by means of an air flow) was placed in a flask connected to a suction pipe through a cartridge filled with glass wool, and the flask was placed in a drier kept at 180° C. After lapse of 30 minutes, the generated amount (%) of tar was calculated by the following formula:

$$\text{Generated amount of tar (\%)} = \frac{w_2}{w_1} \times 100$$

In the formula, $w_1$: weight decrease of the test piece during the lapse of 30 minutes. $w_2$: weight increase of the cartridge during the lapse of 30 minutes.

It can be seen from Table 1 that the hardened paint films of Examples 1–4 are superior to the hardened paint film of Comparative example 1 in pencil hardness, impact resistance, flexibility and acetone rubbing resistance. Further, the electrodeposited paint films of Examples 1–4 are smaller in the amount of generating tar than the electrodeposited paint film of Comparative example 1.

EXAMPLE 5

To 100.0 parts of the self-hardenable resin composition solution obtained in Example 3 were added 4.0 parts of acetic acid, 50.9 parts of titanium dioxide, 21.8 parts of kaolin, 3.8 parts of carbon black and 138.0 parts of deionized water, and the resulting mixture was mixed and dispersed by means of a sand grindmill to obtain a pigment paste having a solid content of 40.3%.

Then, 144 parts of the above obtained pigment paste was added to 1,000 parts of the aqueous dispersion obtained in Example 3 and having a solid content of 15% to obtain a paint composition having a solid content of 18.1%.

The resulting paint composition was used, and a cationic electrodeposition painting was carried out in the same manner as described in Example 1, except that a DC current of 240 volt was applied for 3 minutes. After washed with water, the electrodeposited paint film was baked at 150° C. for 25 minutes to obtain a hardened paint film having a thickness of 20 microns in dry state.

The test results of the resulting hardened paint film are shown in Table 2.

COMPARATIVE EXAMPLE 2

To 100.0 parts of the polyamine resin solution obtained in Comparative example 1 were added 4.0 parts of acetic acid, 48.9 parts of titanium dioxide, 20.9 parts of kaolin, 3.7 parts of carbon black and 136.0 parts of deionized water, and the resulting mixture was mixed and dispersed by means of a sand grindmill to obtain a pigment paste having a solid content of 39.0%.

Then, 145 parts of the above obtained pigment paste was added to 1,000 parts of the aqueous dispersion obtained in Comparative example 1 and having a solid content of 15% to obtain a paint composition having a solid content of 18.0%.

The resulting paint composition was used, and a cationic electrodeposition painting was carried out in the same manner as described in Example 1, except that a DC current of 220 volt was applied for 3 minutes. After washed with water, the electrodeposited paint film was baked at 150° C. for 25 minutes to obtain a hardened paint film having a thickness of 20 microns in dry state.

The test results of the resulting hardened paint film are shown in Table 2.

TABLE 2

| Test item | Test method | Example 5 | Comparative example 2 |
|---|---|---|---|
| Pencile hardness | Mitsubishi Uni | 2H | F |
| Adhesion | cross cut adhesion 1 mm² | 100/100 | 100/100 |
| Impact resistance | du Pont tester, ½ inch, 500 g | 50 cm, passed | 20 cm, passed |
| Flexibility | flexural test, 10 mmφ, 180° | no change | cracks |
| Corrosion resistance | JIS K5400, note (1) | 1,500 hours, no change | 800 hours, not passed |
| Water resistance | immersed at 40° C. | 240 hours, passed | 240 hours, passed |
| Acid resistance | immersed in 0.2 N aqueous solution of sulfuric acid | 48 hours, passed | 48 hours, passed |

Note (1) A sample hardened paint film, whose peeled length is within 3 mm in one side from the cut portion in a peeling test by means of an adhesive tape, is estimated to be passable.

It can be seen from Table 2 that the hardened paint film of Example 5 according to the present invention is superior to that of Comparative example 2 in pencil hardness, impact resistance, flexibility and corrosion resistance.

INDUSTRIAL APPLICABILITY

It can be seen from the above explanation that, according to the present invention, a self-hardenable resin composition which has a low-temperature hardenability, and adapted for the cationic electrodeposition painting wherein a material to be painted is used as a cathode, and can form a hardened paint film having a high pencil hardness, impact resistance, flexibility and corrosion resistance, can be obtained.

We claim:

1. A self-hardenable resin composition consisting essentially of a Michael type addition reaction product consisting of 65–95% by weight (in solid base) of a polyamine resin having amino groups and/or imino groups and 5–35% by weight of an ethylenically unsaturated compound having an amine-imido group.

2. A self-hardenable resin composition according to claim 1, wherein the polyamine resin is a reaction product of a polyepoxide with a ketimine-blocked amino group-containing polyamine or a primary amine.

3. A self-hardenable resin composition according to claim 1, wherein the ethylenically unsaturated compound having an amine-imido group is respresented by the following general formula:

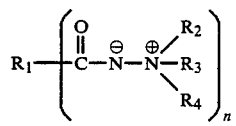

wherein n is an integer of 1 or 2, $R_1$ represents a residue of mono- or di-basic ethylenically unsaturated carboxylic acid, and $R_2$, $R_3$ and $R_4$ represent alkyl or hydroxyalkyl groups having 1–6 carbon atoms.

4. A self-hardenable resin composition according to claim 1, wherein the ethylenically unsaturated compound having an amine-imido group is introduced into the polyamine resin by a Michael type addition reaction.

5. A self-hardenable resin composition according to claim 1, wherein the amine-imido group in the Michael type addition reaction product is converted into an isocyanate group through a thermal decomposition or a rearrangement, and the addition reaction product is crosslinked or thermally hardened by the action of the isocyanate group as a hardening agent.

6. A self-hardenable resin composition according to claim 1, wherein the amine-imido group in the Michael type addition reaction product is neutralized with an acid to form a quarternary ammonium base, whereby the addition reaction product is dispersed in an aqueous medium.

7. A self-hardenable resin composition according to claim 1, wherein the self-hardenable resin composition is neutralized with an acid and dispersed in an aqueous medium so as to be used as a resin composition for cationic electrodeposition painting.

* * * * *